G. F. FOWLER.
TIMING DEVICE FOR CREAM SEPARATORS.
APPLICATION FILED AUG. 18, 1915.
1,202,176.
Patented Oct. 24, 1916.
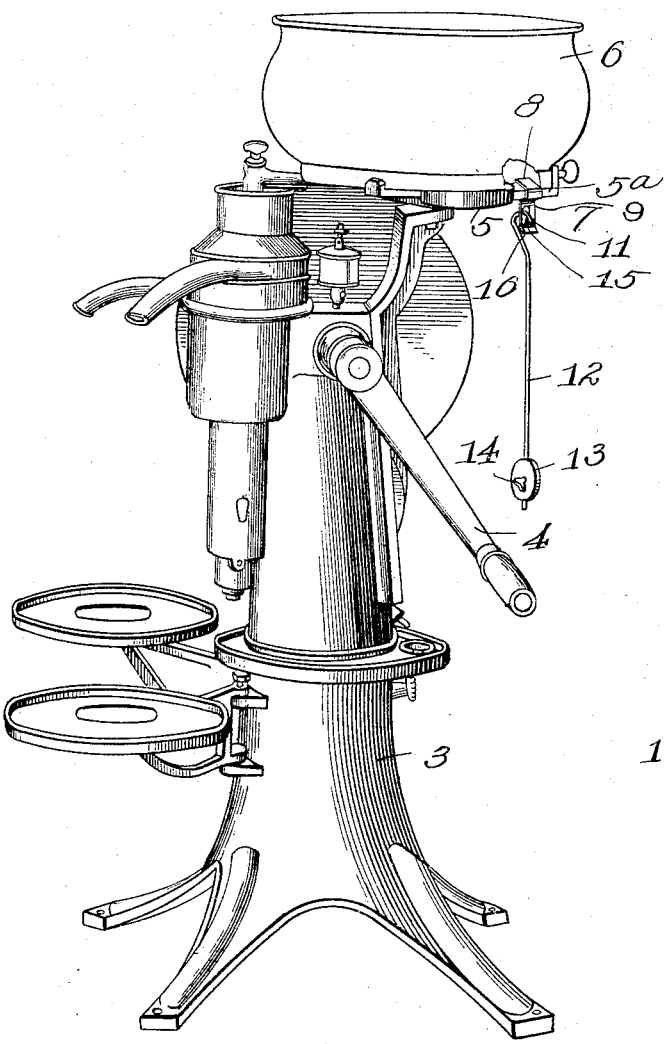
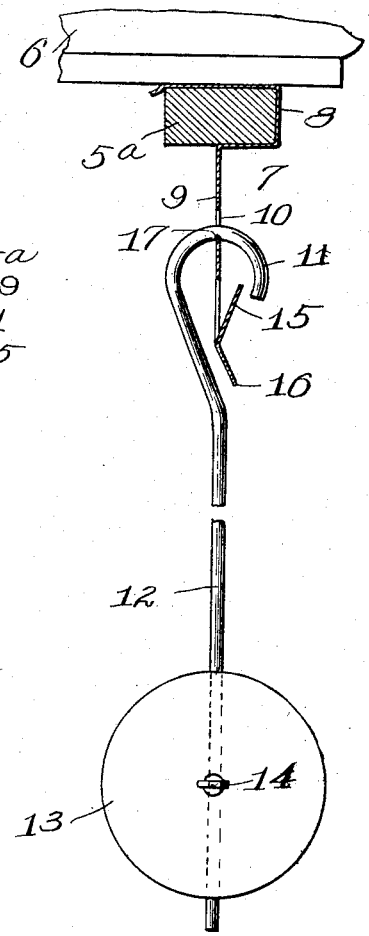
Witness
G. A. Nauberschmidt
Inventor:
Gordon F. Fowler,
By Miller & Chindahl
Attys

UNITED STATES PATENT OFFICE.

GORDON F. FOWLER, OF OAK PARK, ILLINOIS, ASSIGNOR TO SEARS, ROEBUCK AND COMPANY, OF CHICAGO, ILLINOIS, A CORPORATION OF NEW YORK.

TIMING DEVICE FOR CREAM-SEPARATORS.

1,202,176.   Specification of Letters Patent.   Patented Oct. 24, 1916.

Application filed August 18, 1915. Serial No. 46,101.

*To all whom it may concern:*

Be it known that I, GORDON F. FOWLER, a citizen of the United States, residing at Oak Park, in the county of Cook and State of Illinois, have invented certain new and useful Improvements in Timing Devices for Cream-Separators, of which the following is a specification.

Cream separator bowls must be driven at high speed in order to separate the butter fat from the milk, and to obtain the greatest separating efficiency it is necessary that the hand crank be turned at a uniform and correct speed, this speed ordinarily being designated by the manufacturer. Heretofore users of cream separators have sometimes timed the rotation of the crank by means of a watch, but this is an inconvenient method and it more often happens that the speed of the crank is guessed at, with the result that losses and variations in butter fat occur, as shown by cream tests.

It is one of the objects of my invention to provide a cream separator with means by which the rotation of the hand crank may be accurately timed.

Another object is to produce a timing device in the form of an attachment adapted to be applied to any existing separator.

A further object is to produce a timing device which is arranged to be actuated by the swaying movement or vibration of the separator caused by the impulses imparted to the hand crank by the operator.

Another object is to produce a timing device which is adjustable to time different speeds of the crank handle.

My invention also contemplates a device of this character which is simple and durable in construction and cheap to manufacture.

In the accompanying drawing, Figure 1 is a perspective view of a cream separator having mounted thereon an attachment embodying the features of my invention, a portion of the supply tank being broken away to better show the attachment. Fig. 2 is an enlarged, fragmental view with parts in section illustrating the device.

In the drawings, 3 indicates the base of the separator, 4 the crank handle by which the parts are driven, and 5 the bracket upon which the supply tank 6 is supported. This bracket, in the present instance, comprises arms 5ª having upturned ends to engage the tank 6.

In the preferred embodiment herein shown my timing device comprises a supporting member 7, which is formed of sheet metal and comprises a clip portion 8 adapted to embrace the outer one of the arms 5ª, the tank 6 resting on the upper side of said clip portion. Beneath the said clip is a vertical depending portion 9 having an opening 10 therein to receive the hooked upper end 11 of a pendulum rod 12, on the lower end of which rod is mounted a weight 13. Preferably, the weight is slidable along the rod, being held in any desired position by a set-screw 14. Beneath the opening 10 the supporting member has a tongue 15 bent laterally therefrom, and the lower end 16 of the supporting member is also bent laterally in the same direction. When the pendulum is swinging the movement thereof in one direction is limited by abutment of the rod 12 against the lower end 16 of the member, and movement in the other direction is limited by engagement of the hooked upper end 11 of the rod with the end of the tongue 15. In this manner the length of the oscillation of the pendulum is accurately limited. The hooked portion 11 of the pendulum rod may have a notch 17 in its lower surface to receive the supporting edge of the part 9 and prevent slipping of the hook with respect to said part.

In use, assuming the weight 13 to have been secured in such position on the rod 12 that the pendulum will be synchronized with the speed at which it is desired to rotate the hand-crank 4, the pendulum may be manually started in oscillation and the hand-crank brought up to a speed of rotation timed with the oscillations of the pendulum, that is to say, one complete rotation of the crank for one complete back-and-forth movement of the pendulum. The pendulum will, however, start without assistance when the crank is brought up to the proper speed. The impulses imparted to the crank by the operator causes swaying movement or vibration of the separator frame and although such vibration may be very slight and imperceptible to the eye it will be sufficient to start the pendulum and maintain it in oscillation when synchronized with the speed of rotation of the crank. The adjustable mounting of the weight 13 permits of timing the pendulum for different speeds of rotation of the crank, so that the attachment may be used with any separator.

It is obvious that the details of construction of my device may be varied without departing from the spirit and scope of the invention, and I therefore do not limit myself to the exact structure herein disclosed, but aim to cover in the appended claims all modifications and equivalents.

I claim as my invention:

1. A timing attachment for timing the speed of a cream separator crank comprising a sheet metal supporting member having a clip portion adapted to engage an arm of the bowl-supporting bracket and having a depending portion beneath said clip portion, said depending portion having an opening therein and having a tongue beneath said opening which is bent laterally, the lower end of said portion beneath said tongue being also bent at an angle, a pendulum rod having a hooked upper end passing through said opening in the depending portion and having a notch engaging the lower wall of said opening, the end of said hooked end being arranged to abut against said tongue and the body of the rod being arranged to abut against the angular lower end of said depending portion to limit the length of oscillation of said rod, and a weight carried upon the lower portion of said rod.

2. A timing device for timing the rotation of a cream separator crank comprising a sheet metal supporting member arranged to engage the bowl-supporting bracket on the separator, said member having an opening therein, a pendulum rod having a hooked upper end passing through said opening and supported thereby, angular portions on said member beneath said opening to limit the swinging movement of said rod, and a weight carried upon the lower end of said rod.

3. A timing device for timing the rotation of a cream separator driving crank comprising a supporting member adapted to be attached to a part on the separator, a pendulum rod having an upper end adapted to engage said supporting member, means on said member to limit oscillatory movement of said rod, and a weight carried by said rod.

4. An attachment for timing the rotation of a cream separator crank comprising a sheet metal supporting member having a portion to engage a part on the separator and having a depending portion provided with an opening, a pendulum having a hooked end passing through said opening, and means on said member beneath said opening to limit the oscillation of said pendulum.

5. The combination of a machine having a hand crank for driving the same, and a pendulum mounted on the machine and synchronized with the speed of rotation to be given said crank, whereby the vibration imparted to the machine by the impulses on said crank will maintain the pendulum in oscillation.

6. The combination with a cream separator having a hand crank and a bracket, of a pendulum depending from and directly supported by said bracket and arranged so that the vibrations of the separator caused by the turning of the hand crank will cause oscillation of the pendulum.

7. The combination with a cream separator having a hand crank and a bracket, of an apertured member mounted on said bracket, and a pendulum having its upper end engaging in the aperture of said member and supported thereby, the pendulum being arranged to be oscillated by the vibrations of the separator caused by the turning of the hand crank.

8. The combination of a machine having a hand crank for driving the same, a pendulum mounted on the machine, and means whereby the pendulum weight may be adjusted to render the pendulum synchronous with the vibrations caused by rotation of said hand crank, whereby the pendulum may be oscillated by said vibrations.

In testimony whereof, I hereunto set my hand in the presence of two witnesses.

GORDON F. FOWLER.

In the presence of—
 JOHN R. BOLLEY,
 BESSIE PEARSON.

Copies of this patent may be obtained for five cents each, by addressing the "Commissioner of Patents, Washington, D. C."